Aug. 2, 1938.　　A. G. BLANCHARD　　2,125,483
HYDRAULIC WEIGHING AND TESTING MACHINE
Filed June 26, 1936　　5 Sheets-Sheet 1

Inventor
Alva G. Blanchard,
By Church & Church
His Attorneys

Aug. 2, 1938.  A. G. BLANCHARD  2,125,483
HYDRAULIC WEIGHING AND TESTING MACHINE
Filed June 26, 1936  5 Sheets-Sheet 2

Inventor
Alva G. Blanchard,
By Church & Church
His Attorneys

Aug. 2, 1938. A. G. BLANCHARD 2,125,483
HYDRAULIC WEIGHING AND TESTING MACHINE
Filed June 26, 1936 5 Sheets-Sheet 3

Inventor
Alva G. Blanchard,

By Church & Church
His Attorneys

Aug. 2, 1938. A. G. BLANCHARD 2,125,483
HYDRAULIC WEIGHING AND TESTING MACHINE
Filed June 26, 1936 5 Sheets-Sheet 4
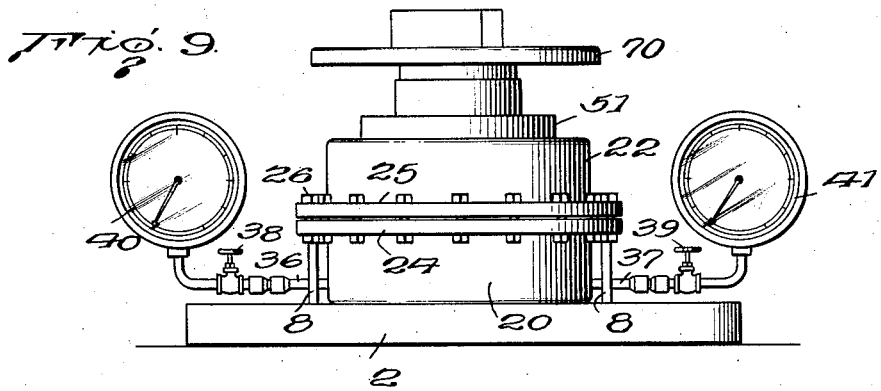
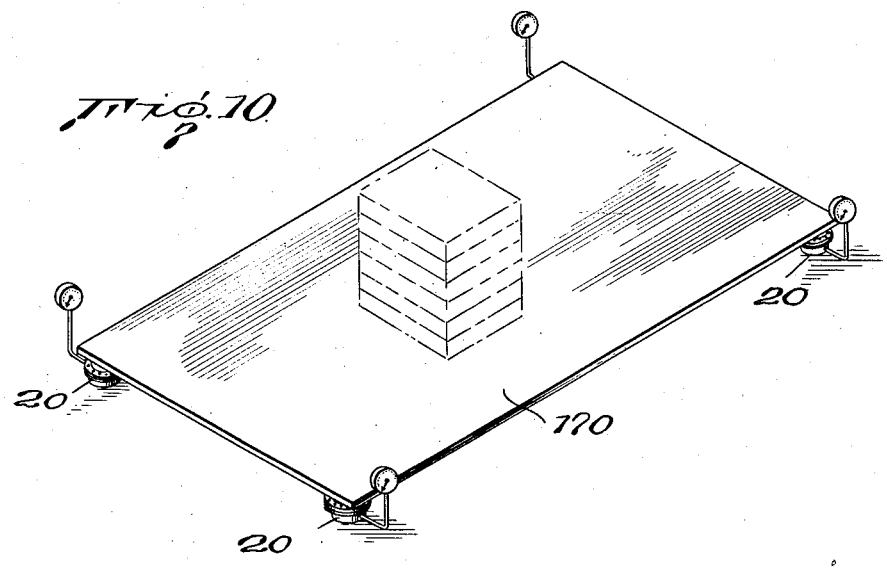
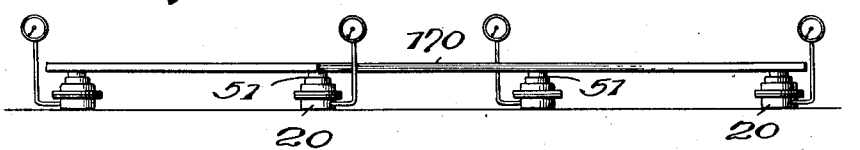

Aug. 2, 1938.  A. G. BLANCHARD  2,125,483
HYDRAULIC WEIGHING AND TESTING MACHINE
Filed June 26, 1936   5 Sheets-Sheet 5
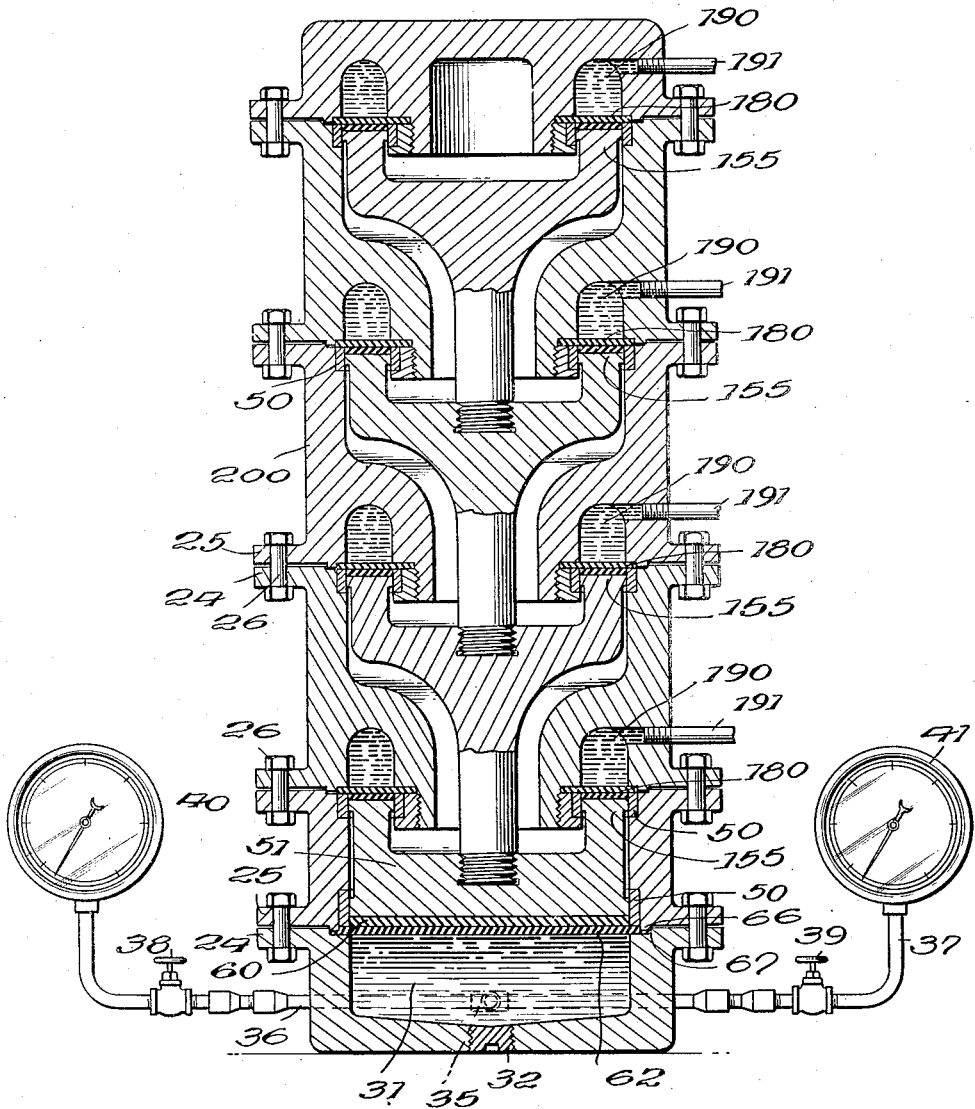
Inventor
Alva G. Blanchard,
By Church & Church
His Attorneys Patented Aug. 2, 1938

2,125,483

UNITED STATES PATENT OFFICE 2,125,483

HYDRAULIC WEIGHING AND TESTING MACHINE

Alva G. Blanchard, Shreveport, La.

Application June 26, 1936, Serial No. 87,528

5 Claims. (Cl. 265—47)

This invention relates to an apparatus for testing objects in the sense that objects may be weighed, or their strength subjected to tensional or compressive strains.

One object of the invention is to provide an apparatus of the character described wherein the strength or weight of materials can be accurately determined. Specifically, this object contemplates a novel construction utilizing an indicating mechanism operable by pressure exerted on a body of liquid through a diaphragm covering the said body, the construction and arrangement of the diaphragm, with respect to the reservoir for the liquid, being such that accurate tests may be made.

A further object of the invention is to provide an apparatus wherein all of the factors above mentioned, i. e., weight, tensional strength and compressive strength of objects can be determined.

A still further object is the provision of a testing apparatus wherein the object to be tested or weighed is supported on a large platform which, in turn, is supported by a plurality of pressure-responsive devices associated with an indicating mechanism in such fashion that the pressures on all of the pressure-responsive devices may be cumulatively registered on said indicating means. In other words, there is a single indicator and the pressures on the several individual pressure-responsive devices are registered by the single indicating means.

With these and other objects in view, the invention consists in certain details of construction and combinations and arrangements of parts, all as will hereinafter be more fully described and the novel features thereof particularly pointed out in the appended claims.

In the accompanying drawings—

Fig. 9 is a simplified form of apparatus for weighing an object;

Fig. 10 is a perspective view illustrating the use of an enlarged platform with the apparatus;

Fig. 11 is an elevational view of the platform illustrated in Fig. 10; and

Fig. 12 is a vertical sectional view of the instrumentalities for indicating collectively the pressures exerted on the pressure-responsive supports of the platform shown in Figs. 10 and 11.

Figure 1:
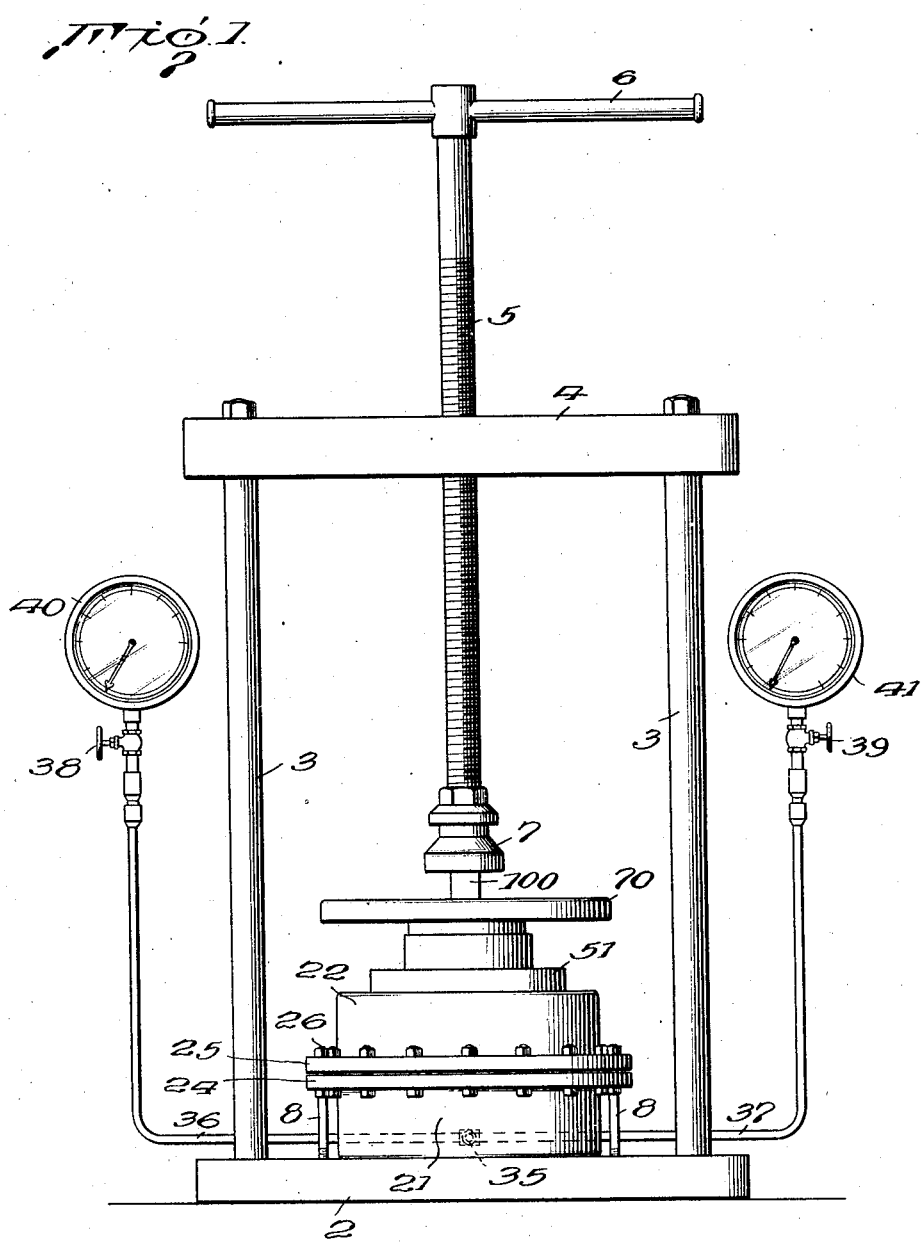
Figure 1 is an elevational view of one form of the apparatus which is especially adapted for measuring the compressive strength of an object or for weighing an object.

In the apparatus of Fig. 1, there is a base member 2, provided with uprights 3, said uprights at their upper ends supporting a cross beam 4 through which a bar 5 is threaded, said bar being disposed vertically of the apparatus. The upper extremity of threaded bar 5 is provided with a handle 6 or other means for rotating the same to screw the bar upward or downward in cross beam 4, and at its lower extremity the threaded bar 5 is provided with a swivel base or bearing block 7 whereby the bar may be rotated without necessarily imparting a rotary motion to the bearing block. Secured on the base 2 is a sectional cylinder consisting of a lower section 21 and an upper section 22, the two sections being secured together by bolts 26 extending through the flanges 24, 25, on the sections 21, 22, respectively. This cylinder is preferably rigidly secured to the base 2 by bolts 9. As shown more particularly in Fig. 6, the upper and lower sections 21, 22, are of the same internal diameter, but the interiors of the two sections are separated by a diaphragm 60 of rubber or some similar incompressible substance. Exact alinement of the upper and lower sections of the cylinder is maintained by means of an annular lip 66 on the upper section fitting within an annular recess 67 in the lower section. The lower section 21 of the cylinder is filled with an incompressible fluid, preferably water, as indicated at 31. When filling this lower section 21, the same is preferably inverted so as to permit the escape of all air from within and permit complete filling of the cylinder section with the liquid. To facilitate the expulsion of the air, the bottom of the cylinder slopes downward toward the center where a removable plug 32 is inserted, so that when the section is in inverted position, the hole into which the plug screws will be the highest point and all the air will pass out, thus preventing trapping of air in the cylinder section. An outlet or conduit 33 from section 21 of the cylinder extends to one or more gauges. In the present instance, two gauges are illustrated, one of them designed for use in denoting higher pressure or excessive weights, and the other made more delicate for measuring lower pressures and smaller weights, said gauges being indicated by the numerals 40 and 41. Where more than one gauge is used, conduit 33 extends into a fitting 35 from which branch pipes 36, 37, extend to the gauges 40, 41. Valves 38 and 39 in the branches 36, 37, permit the gauges to be connected or rendered operative, as desired. For instance, valve 38 should be closed for the protection of the more delicate gauge 40 when higher pressures are involved, valve 39 for gauge 41 being open at such times while, on the other hand, for indicating lesser pressures or weights, valve 39 will be closed and valve 38 opened to render operative the more delicate gauge 40.

As previously mentioned, the interior diameters of the two sections 21, 22, are the same, but this is preferably accomplished by the use of a liner 50, of easily machinable material, such as brass, said liner being inserted within the upper section 22 of the cylinder. The liner preferably fits snugly in section 22, being a light shrink or light drive fit. The piston 51 works or is adapted to reciprocate, within the liner of the upper cylinder section, and the bead 52 on said piston is preferably machined to a very close fit inside the liner 50, the fit being as close as possible without interfering with the free movement of the piston in the upper cylinder section. The piston should be very carefully machined for smoothness on its lower end which is adapted to engage or rest upon the top of the rubber diaphragm 60. If desired, a plate 70 may be mounted upon the top of the piston 51 to serve as a platform or bearing surface for objects to be tested or weighed. However, such a plate is not essential in those cases where the upper surface of the piston itself is of sufficient area to support the object being tested.

Figure 6:
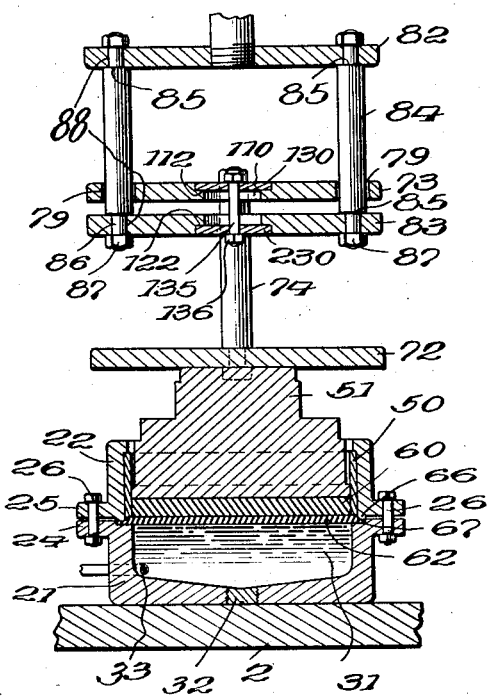
Fig. 6 is a vertical sectional view on the line 6—6 of Fig. 3.
Figure 7:
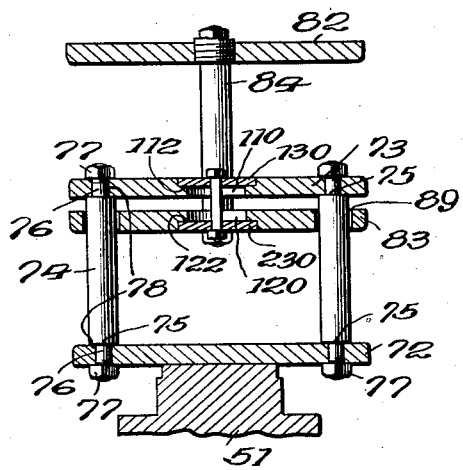
Fig. 7 is a like view on the line 7—7 of Fig. 3.

Also, as shown in detail in Fig. 6, diaphragm 60 is composed of two parts, there being a lower section 62 of relatively thin material that is non-compressible but flexible, a soft gum rubber being preferred. This lower section or sheet of rubber is somewhat larger than the upper section 60 although the latter is rather thick compared to section 62. The purpose of forming the lower thin sheet 62 of greater area is in order that its edges may extend beneath and be gripped by the annular lip 66 when the two sections of the cylinder are clamped together. The upper or thicker sheet of rubber 60 is made of less diameter, being cut to fit exactly, or as near as possible, the interior cross-section of the liner 50 which, in effect, forms the inner surface of upper cylinder section 22. The pressures or weights applied upon plate 70 are transmitted, as will be apparent, through piston 51 upon upper diaphragm section 60 and through the diaphragm to the water or other incompressible fluid 31 in the lower section or reservoir 21 of the cylinder and the unit pressure induced in the water will be transmitted to and registered by the gauges 40 and 41, as previously explained. The outer diameter of the bead 52, the inner diameter of the liner 50, and the outer diameter of the upper section 60 of the diaphragm are preferably made of such a size that the area will be some exact number of square inches, so that the weight or total force bearing upon the plate 70 and transmitted through piston 51 will be an even multiple of the unit pressure transmitted by the water to the gauge. For instance, if the diameters of the parts mentioned are such that the diaphragm section 60 is exactly ten square inches, then the unit pressure upon the liquid 31 will be exactly one-tenth of the weight or total force applied upon the piston 51 and, consequently, the reading of the gauges 40 and 41 should be multiplied by ten to give the true force in pounds upon the piston. Of course, the gauges themselves might be calibrated to show the total force upon the piston rather than the unit pressure in pounds per square inch upon the liquid. Referring to Fig. 1, the total force exerted by the screw 5 upon the block 100 being tested for its compressive strength will be transmitted through the plate 70 and piston 51 to the diaphragm and the body of water 31 and thence to the gauge 40 or 41. Likewise, if an object is to be weighed, it may be placed on the plate 70 or directly on the piston 51, so that the force created by its weight will be registered on the gauges.

The construction of the present diaphragm is such that a very accurate reading will be had in the use of the present apparatus. Since the diaphragm is made of some pliable, non-compressive substance, if the upper portion 60 thereof does not fit exactly within the cylinder liner 50, the force of the piston acting upon it will force it out to an exact fit within the cylinder. The water 31 in the lower section of reservoir 21 of the cylinder being incompressible will support the bottom section 62 of the diaphragm so that pressure on the soft upper member 60 will cause it to spread and fill the entire cross-sectional area of the liner 50. A further tendency toward downward movement of piston 51 will then cause the diaphragm to expand in all directions away from the cylinder which, following the lines of least resistance, would cause a bulge down near the middle of the diaphragm. This will take up the area affected by any small amount of motion or flow of water 31 toward the gauges for the operation of the latter and maintain and transmit to the water 31 all the force applied upon and transmitted to the upper side of the diaphragm by the piston which would not be the case if a stiffer and more resistant diaphragm material were used. It is believed that this form of diaphragm in connection with the piston and cylinder will very closely approximate a perfect transfer of the load carried by the piston to the fluid beneath the diaphragm. For instance, if the diaphragm were of uniform thickness, all the way across the cylinder and under the cylinder head and if the fluid chamber beneath the cylinder was of the same diameter as the upper section, then the motion of the piston occasioned by the weight upon it would set up shearing stresses in the diaphragm adjacent the cylinder wall which would support a large part of the weight or pressure transmitted by the piston, so that the entire amount of weight or pressure would not be transmitted to the fluid below the diaphragm.

Figure 2:
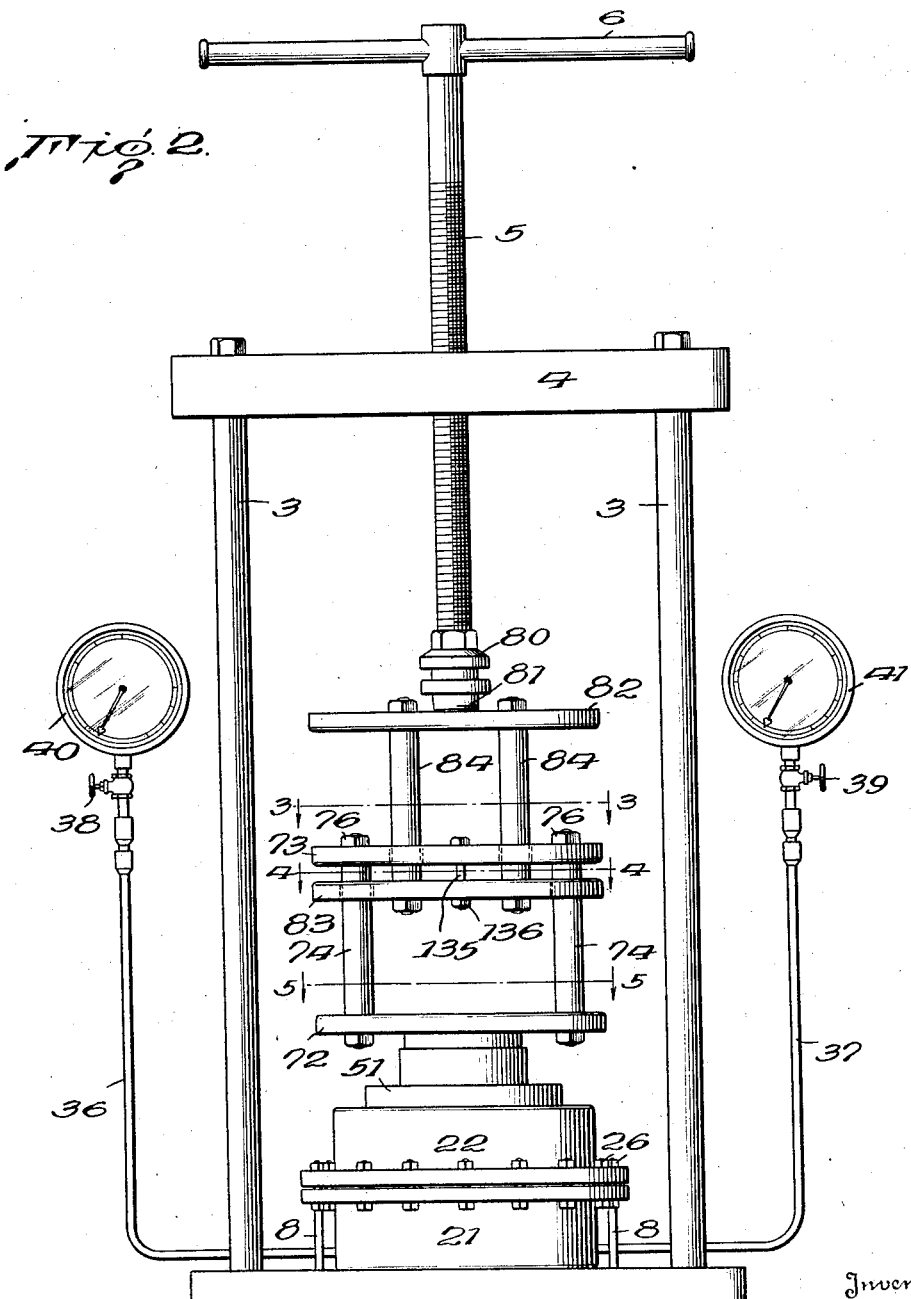
Fig. 2 is a similar view of a modified form of apparatus by which an object may be weighed or its compressive or tensional strength determined.
Figure 3:
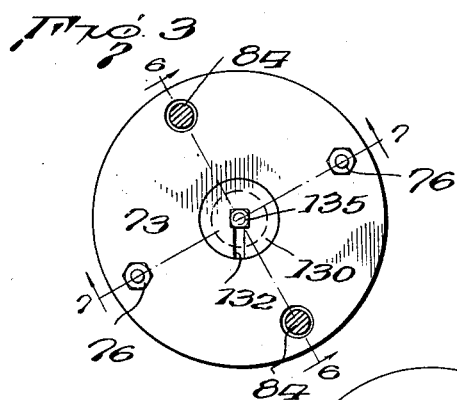
Fig. 3 is a horizontal sectional view on the line 3—3 of Fig. 2.
Figure 4:
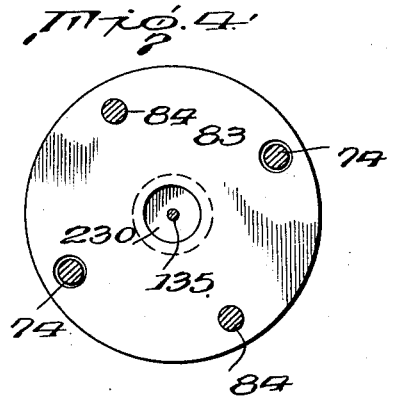
Fig. 4 is a similar view on the line 4—4 of Fig. 2.
Figure 5:
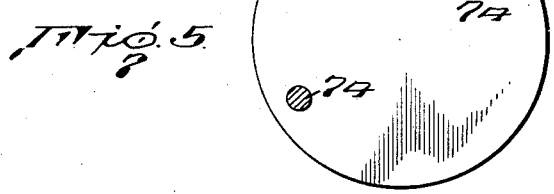
Fig. 5 is a like view on the line 5—5 of Fig. 2.

In the more elaborate apparatus illustrated in Fig. 2, which is capable not only of weighing articles and testing their compressive strength, but which is also capable of testing the tensional strength of articles, a disc or plate 72 adapted to rest upon the top of piston 51 is rigidly attached to, but spaced from, a plate or disc 73 by members 74, the latter having annular shoulders 75 and threaded extremities of decreased diameter as indicated at 76. These threaded end portions 76 extend through bores 78 in discs 72, 73, and nuts 77 are screwed down over 7, the threaded portion 76 against the discs 72, 73. With this arrangement, members 74 serve as spacer members to hold discs 72, 73, rigidly together, but properly spaced from one another. Attached to the lower end of the threaded bar 5 is a swivel 80 with a threaded lower portion 81 adapted to be screwed into a disc 82 approximately at the center of the latter. Disc 82 is rigidly attached to be spaced from another disc 83 by means of members 84 which serve as spacers in the same manner as members 74 described above, so that the discs 82 and 83 are attached but spaced from one another. The bolts or members 84 have annular shoulders 85 and reduced threaded end portions 86 passing through bores 88 in discs 82, 83, and adapted to receive nuts 87 to secure the discs 82, 83, together. Disc 73 which is positioned above disc 83 contains two bores 79 through which the members 84 extend, the opening 79 being slightly larger in diameter than said members 84. Likewise, plate 83 is provided with openings 89 for the connecting members 74 of plates 72, 73. With the apparatus so assembled, plate 83 rigidly attached to plate 82 is below plate 73, but is free to move upwardly or downwardly relatively to the plate 73, being limited in such movement only by the distance between plates 72, 73.

Figure 8:
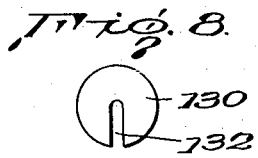
Fig. 8 is a detail plan view of the central portion or disc-like member used when objects are to be tested in tension.

Plate 73 is provided with a central opening 110, said opening being somewhat enlarged at the upper surface of the plate to provide an annular shoulder 112. Shoulder 112 provides a seat at the upper side of the plate 73 for the disc 130 (Fig. 8), said disc having a slot 132 extending from its periphery to the center thereof. Likewise, plate 83 is provided with a central opening 120, the opening being somewhat enlarged at the lower surface of the plate to provide a shoulder 122 which constitutes a seat for a disc 230 which has a central opening. A bolt or other member to be tested for its tensional strength is inserted through the slot 132 of disc 130 and its threaded end projected through the opening in the disc 230 in plate 83. The nut 136 is then applied to the lower protruding extremity of the bolt to prevent withdrawal of the bolt from disc 230. With the bolt so secured in the apparatus, screw bar 5 is rotated to transmit a downward thrust through swivel 80 and plate 82 which causes this downward thrust to be transmitted through spacer members 84 to plate 83 which, in turn, transmits the thrust through disc 230 to the lower end of the bolt being tested. The bolt, in turn, transmits the downward thrust through disc 130 to plate 73 and from the latter the thrust is transmitted by spacer members 74 to plate 72 bearing on the upper surface of piston 51. As will be understood from a previous description of the operation of piston 51, said piston will transmit the downward thrust to diaphragm 60 and thence to the water 31 in the lower portion of the cylinder, the pressure imposed on the diaphragm and water being indicated by the gauge or gauges as previously described. Continued rotation of the screw bar to apply increased thrust results in a greater load upon the bolt being tested, the same being registered at all times on the gauge or gauges until finally the load exceeds the strength of the bolt and ruptures or causes failure thereof, after which the thrust no longer applies and the piston and gauge hand return to normal position or "zero".

Fig. 9 illustrates the present apparatus when used as an ordinary scale or weighing device, although it will be appreciated that in an apparatus such as illustrated in Fig. 2, articles may be weighed directly on the piston 51 or compressive stresses imposed on an article interposed between the piston 51 and the lower plate 72. In the apparatus of Fig. 9, the frame-work carrying the cross beam and screw bar 5 are eliminated. The platform 70 may be used if an area greater than that of the piston is required for supporting the article being weighed.

For very large objects, too bulky or too heavy to be handled on a single piston, a large platform may be used, as illustrated in Figs. 10 to 12. As shown in Figs. 10 and 11, the platform 170 may be supported at any number of points, usually at the four corners, by pistons 51 operating in cylinders 20 constructed as previously described. Since the object to be weighed, in all probability, would not be positioned in the exact center of such a large platform, the weight thereof would not be equally divided between, or imposed upon, the four pistons and cylinders. However, notwithstanding the inequality of pressures exerted on the several pistons, the total weight of an object on the platform can be determined by adding the weights shown upon the several gauges of the four cylinders. Fig. 12 shows an arrangement by means of which the total weight upon all of the cylinders used in the apparatus of Figs. 10 and 11 may be shown upon a single indicating gauge. In the device of Fig. 12, the piston 51 acts upon the diaphragms 60, 62, and the force imposed through this piston and diaphragms on the liquid 31 in the reservoir is indicated on one or the other of the two gauges 40, 41, just as in the previous forms of apparatus. However, in this modification, there is an upward extension on piston 51 forming a series of annular shoulders 155 adapted to bear against annular diaphragms 180 which are influenced or acted upon by liquid in annular chambers 190 within the outer casing 200. A pipe 191 extends from each annular chamber 190 to one of the reservoirs or cylinders at one of the four corners of the platform 170 in Figs. 10 and 11. Where the platform 170 is supported on four cylinders, the piston in casing 200 will be provided with four annular shoulders 155, and casing 200 will have four annular fluid chambers, one for each of the four cylinders upon which platform 170 is supported. The diaphragms illustrated in Fig. 12 are all of the same arrangement as that previously described in that there are two thicknesses of material, one somewhat larger in diameter than the other. With the apparatus shown in Fig. 12, the pressures exerted on the fluid in the reservoirs of the four cylinders supporting the platform 170 will be transmitted to the fluid in the annular chambers in casing 200 and the piston depressed with a thrust corresponding to the total of the pressures exerted by the platform on its four supporting pistons, so that the pressure imposed by piston 51 in this apparatus of Fig. 12 on the fluid 31 corresponds to the total pressure exerted by the weight of the article being weighed and this total pressure will be indicated on the gauges connected to the reservoir in which the fluid 31 is contained. In this construction, there is essentially a single piston having a series of annular shoulders formed thereon, each of these shoulders engaging an annular diaphragm adapted to respond to the pressure exerted on one of the pistons supporting the platform 170. While they may be considered essentially as a single piston within the casing 200, the casing, as well as the piston, is made in sections for assembly purposes. If the areas of each of these shoulders is the same as the area of the piston in one of the cylinders beneath the platform 170 and is also the same as the area of the piston, then the gauges in this form of apparatus would show the total weight upon the four cylinders supporting the platform. If any different ratio exists, the reading of the gauges must be corrected for accordingly or must be calibrated in such a way as to read in the desired units. In the apparatus, as illustrated, the proportions are such that the gauges will indicate one-fourth of the aggregate weight upon the platform in Fig. 10 and will, therefore, have to be recalibrated to show the total weight of an object on that platform.

What I claim is:

1. In an apparatus of the character described, the combination of a reservoir, a tubular member forming an extension of said reservoir, a diaphragm of incompressible material interposed between said reservoir and extension, a piston slidable in said extension toward and from said diaphragm, a layer of incompressible material interposed between said diaphragm and piston, said material being resilient and plastic whereby pressure thereon will cause it to conform to the interior of the extension, a body of liquid filling said reservoir, and an indicator responsive to pressures imposed on said liquid by said piston through said diaphragm.

2. In an apparatus of the character described, the combination of a fluid reservoir, a tubular member forming an extension of said reservoir, said reservoir and extension being of corresponding interior cross-sectional dimensions, an incompressible diaphragm secured between said reservoir and extension, a relatively thick non-compressible but resilient body supported on said diaphragm within said extension, said body being sufficiently plastic whereby pressure thereon will cause it to conform to the interior cross-section of the extension, a piston in said extension, and indicating means responsive to pressures imposed on said diaphragm by said piston.

3. In a device of the character described, the combination of a liquid reservoir, a cylindrical extension on the upper end of said reservoir, the interior diameter of said reservoir being less than that of said extension to form a shoulder at the junction of said members, a resilient, incompressible diaphragm on said shoulder substantially corresponding to the interior diameter of said extension, a liner in said extension, said diaphragm being held between said liner and shoulder, a relatively thick incompressible body supported on said diaphragm and substantially corresponding to the interior diameter of said liner, a piston in said extension, and indicating means responsive to pressures imposed on said diaphragm by said piston.

4. In an apparatus of the character described, the combination of a casing, a piston, a diaphragm engaged by said piston, means for indicating pressures imposed on said diaphragm by said piston, a series of annular fluid chambers in said casing, an annular diaphragm in each of said chambers, an extension on said piston, and a series of annular shoulders on said extension engaging said annular diaphragms the pressures imposed on said annular diaphragms being transmitted to the first-mentioned diaphragm through said shoulders, extension and piston.

5. In a device of the character described, the combination of a cylinder, the lower end of which forms a liquid reservoir, a liner in said cylinder, liquid filling said reservoir, a piston fitting in said liner, flexible means forming a fluid seal between said liner and said cylinder above said liquid, a layer of rubber between said piston and said means, said layer being resiliently plastic, whereby pressure thereon will cause it to conform to the interior cross section of said liner, and indicating means on said reservoir responsive to pressure on said piston to show the amount of pressure thereon.

ALVA G. BLANCHARD.